Oct. 1, 1929. F. W. JOHNSON 1,729,616
SIGNAL SWITCH DEVICE FOR MOTOR VEHICLES
Filed July 27, 1927

INVENTOR:
Freeman W. Johnson
BY David E. Carlsen
ATTORNEY.

Patented Oct. 1, 1929

1,729,616

UNITED STATES PATENT OFFICE

FREEMAN W. JOHNSON, OF ST. PAUL, MINNESOTA, ASSIGNOR OF ONE-HALF TO RENN A. RATHBURN, OF ST. PAUL, MINNESOTA

SIGNAL SWITCH DEVICE FOR MOTOR VEHICLES

Application filed July 27, 1927. Serial No. 208,739.

My invention relates to direction signals for vehicles and more particularly to an improved signal control device for automobiles having selectively illuminable lighting means for indicating stop, right turn and left turn.

The object of the invention is to provide a very simple and highly efficient signal control device mounted concentric of and over the steering wheel hub of an automobile, said device being thus in easily accessible position and so designed that it is used for horn signals in addition to closing circuit to the direction signals.

Figure 2:
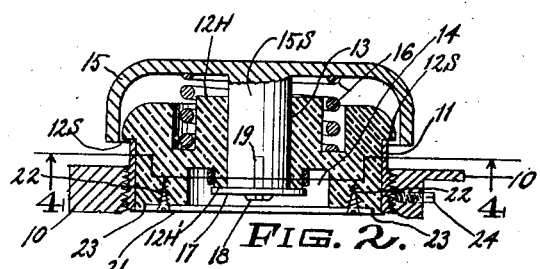
Fig. 2 is a diametrical sectional elevation as on line 2—2 in Fig. 1, in enlarged scale approximately full size.

Referring to the drawing by reference numerals, 10 designates a fixed circular plate as usually provided at the upper end of a steering wheel column and close to the upper end of the hub of the steering wheel, said plate housing a threaded bore 10B for receiving a short threaded collar 11, as in Fig. 2, the part of said collar above the plate being polygonal, (see Fig. 4), for being manipulated by a wrench. In the bore of said collar is placed a plug 12, of insulating material and having an enlarged upper end or head forming a shoulder 12S to engage the upper perimeter of the collar. Said plug has a central bore 13 within a hub 12H formed in the upper part of the plug and extending downwardly through a shorter hub 12H' within a large shallow bore 14 in the lower end of the plug, (see Fig. 2). Said bore receives slidably a stud or stem 15S formed integral and extending downward from the center of a press button 15 flanged outward and downwardly to cover the plug 12, said button being normally pressed upwardly by a compression coil spring 16, and said upward pressure being limited by a washer 17 fixed as with a screw 18 to the lower end of stud 15S, the spring thus being at all times in compression. 19 is a vertically disposed flat bar held diametrically in the lower part of stud 15S by the screw 18 and projecting rearwardly from said stud, (Fig. 4), where it terminates in spaced relation to a fixed pin 20 of nonconductive material in plug 12. 21 is a metal plate fixed with screws 22 concentrically within a shallow recess 23 in the bottom of plug 12 and spaced normally below the head of screw 18 as in Fig. 2.

24 is a set screw for holding collar 11 in fixed position.

Figure 1:
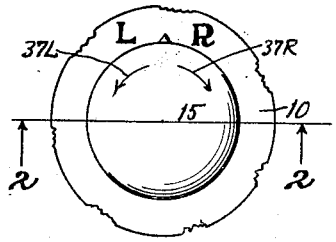
Fig. 1 is a top view of my signal operating device mounted over a stationary plate as provided on autos at the upper end of a steering column.
Figure 4:
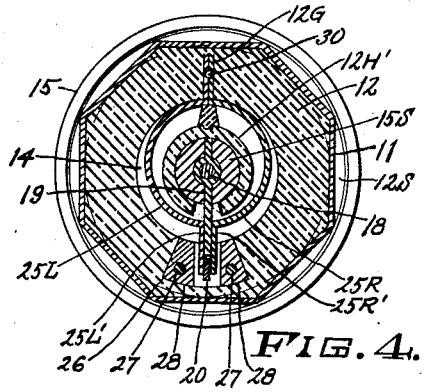
Fig. 4 is a sectional detail view as on line 4—4 in Fig. 2.
Figure 3:
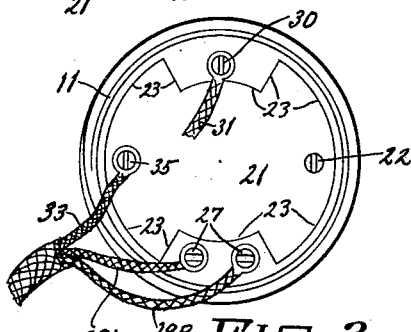
Fig. 3 is a bottom view of Fig. 2 omitting the stationary plate.

25R and 25L are two counterpart flat spring contact members, with parallel front arms retained in a radial groove, 12G in plug 12 forward of its bore 14, and within said bore these spring members are arched around hub 12H' forward of which they are formed with a rearwardly extending arm 25R' or 25L', pressed against opposite sides of arm 19 and in parallel relation to each other and within a pocket or gap 26 in the plug, (Fig. 4). In said gap 26 are fixed by screws 27 at opposite sides of the spring arms 25L' and 25R', and in spaced relation thereto, two metal contacts 28, said screws being inserted from the under side of the plug as in Fig. 3 and connected to certain wires 29R and 29L. 30 is a like screw in the front under side of the plug, connecting a wire 31 from a battery 32 and conducting current to the sounding horn 34. Twisting button 15 to the right, as indicated by arrow 37R in Fig. 1, causes contact arm 19 to push the spring arm 25R into circuit closing contact with adjacent contact 28 and thence through screw 27, wire 29R to lamps designated R illuminating right hand turn signals at the front and rear of the car. Like twisting movement of button to the left causes illumination of the left turn signals designated L in Fig. 6, by closing circuit through arm 19, spring 25L, its contact 27, wire 29L.

Figure 5:
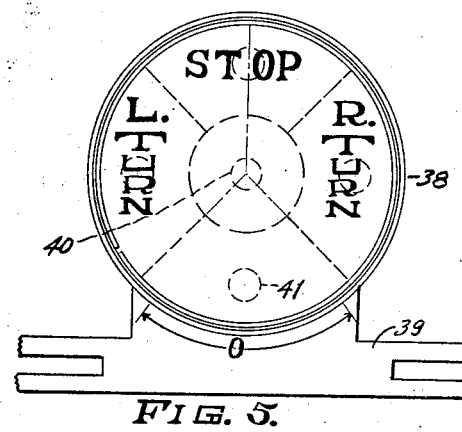
Fig. 5 is an elevation of a preferred type of signal housing as used on the rear end of a motor vehicle and with slight changes, can be also used on the front end of such vehicle.

Fig. 5 illustrates a preferred type of signal, namely a drum-type housing 38, fixed over a license bracket 39. The words R-turn, L-turn, Stop, and other wording as required as indicated are illuminated by suitably partitioned lighting within the housing and the center of the same may be a circular reflector with a bulb 40 for rear light, whereas the lower part has a bulb 41 for illuminating the license and simultaneously provide a suitable parking light. A similar signal housing may be provided for the front of the car with suitable illuminable letters or words.

Figure 6:
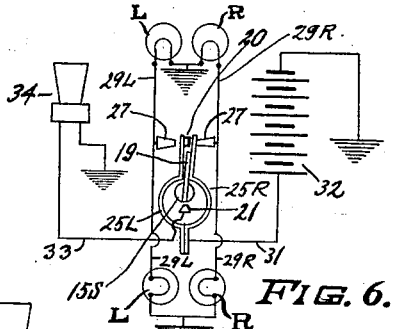
Fig. 6 is a wiring diagram of preferred type and Fig. 7 is a modification of Fig. 6.
Figure 7:
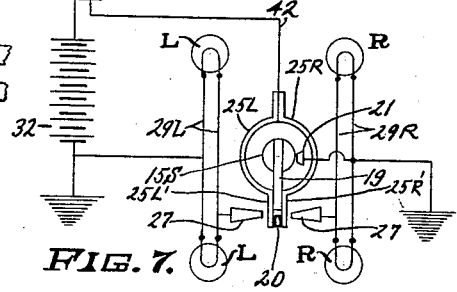

Fig. 7 is simply a modified form of Fig. 6 and in which the battery 32 is connected direct to horn 34, thence via wire 42 charges springs 25R and 25L and signalling in same manner as previously set forth.

The use of my device has been fully disclosed in the foregoing description. It might be further stated however, that the stop pin 20 between the free ends of the spring members 25R and 25L, (Fig. 4), serves to hold either of said members in non circuit-closing position, while the other is being used to signal. It is obvious that the button 15 need not be pressed down to make right and left signals, but is used as a horn sounding means by simply pressing it down to close circuit through plate 21 and wire 33, whether or not the button is used for the turning signals. O in Fig. 5, indicates an opening in bottom part of housing 38 for light to illuminate a license plate, (not shown), on hanger 39.

I claim:

1. A multiple circuit control device of the class described for motor vehicles having a source of electric current and signals in circuit therewith; said device comprising a main non-conductive stationary member adapted to be fixed concentrically on the hub of a steering wheel, a press button with a downwardly directed integral stem reciprocable in said stationary member, yieldable means normally pressing said button upwardly and means limiting the upward movement thereof, said main member having a downward aperture into which said stem projects, a metal plate covering said aperture, means at the lower end of said stem adapted to close a circuit between it and said plate to an audible signal and further means operated by oscillating movement of said button to close a circuit to sets of visible signals selectively.

2. The structure specified in claim 1, in which said latter means for closing circuits comprises a flat arm of electro-conductive material fixed diametrically in said stem and extending outwardly as an arm therefrom, two arched flat-spring arms concentric about said stem joined together forwardly thereof and fixed in the main member, means connecting said joined ends to the source of current, the opposite or free ends of said springs comprising two parallel arms normally sprung one against each side of said flat arm and both extending beyond said arm, a fixed bar in the main member between said spring arms and beyond said flat arm, fixed contracts in the main member each normally in spaced relation to one of said spring arms and in circuit with predetermined signal means, said button dapted to be oscillated by hand to selectively swing the flat arm and press either spring arm into circuit closing contact with either of said contacts.

In testimony whereof I affix my signature.

FREEMAN W. JOHNSON.